Figure 1:
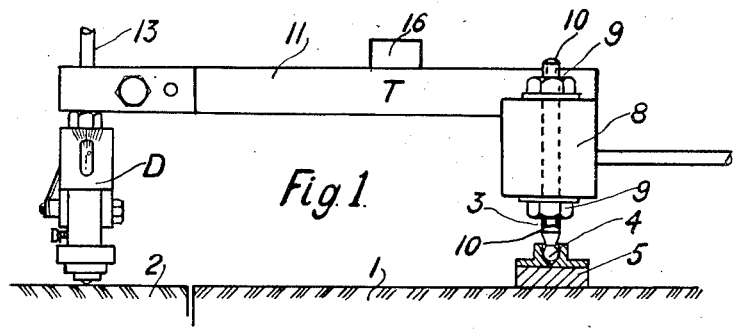

Oct. 13, 1953 P. GRODZINSKI ET AL 2,654,979
METHOD AND DEVICE FOR PRODUCING SPECIFICALLY
ORIENTED POLISHED FACES ON DIAMONDS
Filed Aug. 29, 1950

Inventors
Paul Grodzinski,
Arno L. K. Benkuhn.
By
Atty.

UNITED STATES PATENT OFFICE 2,654,979

METHOD OF AND DEVICE FOR PRODUCING SPECIFICALLY ORIENTED POLISHED FACES ON DIAMONDS

Paul Grodzinski and Arno Ludwig Karl Penkuhn, London, England

Application August 29, 1950, Serial No. 182,108

1 Claim. (Cl. 51—229)

The invention is concerned with a method of and a device for producing polished faces on diamonds or other crystalline bodies which are correctly orientated with regard to the atomic structure of the bodies.

The correct orientation of a polished face is of particular importance for tool diamonds or diamonds used, e. g. in apparatus for scientific purposes. The invention also proposes devices for obtaining the correct orientation and keeping the crystalline material correctly orientated during the polishing procedure.

The method used hitherto was to polish a tool face and have the finished tool face investigated by X-ray diffraction. From the Laue, or, preferably, Weissenberg pattern obtained, a stereogram was made showing how much the principal crystal axis deviated from the coordinates of the tool. According to the orientation determined by the stereogram the tool diamond had to be repolished but it was extremely difficult to transfer the data on the stereogram to the diamond polishing machine, sometimes the directions were mixed up and a diamond face resulted the direction of which differed from the desired plane more than originally.

It is an object of the invention to dispense with the step of obtaining a stereogram.

It is another object of the invention to have the diamond adjusted in its holder by the X-ray physicist while it is under observation in the X-ray goniometer.

It is a further object of the invention to transfer the holder with the diamond from the X-ray goniometer to the tang over the scaife without altering the adjusted position, so that the polished face must automatically show the orientation as desired.

Accordingly the invention comprises the following steps in a method of producing specifically orientated polished faces on diamonds: A first step, in which the stem of a dop with a diamond fixedly mounted in the dop is clamped in a tang over a scaife; a second step, in which the dop is adjusted in a position which is chosen by the operator after ordinary inspection as likely to satisfy polishing conditions; a third step, which consists in taking the stem with the adjusted dop out of the tang and transferring it into a corresponding holder for the stem in a X-ray goniometer, the stem thus being in exactly the same position with regard to a plane corresponding to the surface of the scaife as in the tang; a fourth step, in which the dop is readjusted with regard to a desired plane as determined by direct observation in the goniometer without altering the position of the stem in the holder; and a final step, which consists in transferring the stem with the X-ray adjusted dop into its previous position in the tang over the scaife for starting the polishing procedure on the orientated diamond. The polishing can now proceed automatically without any further adjustment by the polisher in accordance with the crystal orientation of the stone. However, to control the adjustment, the X-ray investigation may be repeated as a routine procedure after the polishing of a facet.

For carrying out the method according to the invention, a tang is used adjustable with regard to the scaife in such a manner that the stem of a dop, i. e. the axis of the dop holder is exactly, e. g. at right angles to the surface of the scaife. The correct position of the tang is controlled by a circular spirit level mounted on it. All angular measurements are then taken in relation to the axis of the dop.

The usual dop of the diamond polisher is adjusted by bending the stem. The adjustments, however, will not be accurate enough apart from the fact that the procedure is rather cumbersome. Therefore, a mechanical dop is preferable which is angularly adjustable in two directions about axes at right angles to each other, which in zero position intersect the axis of the dop. The stone itself may be fixed in a small solder cup under the dop. This has the advantage that the stone on which one correctly orientated plane has to be determined, can be a stone of absolutely irregular shape. As the experienced diamond polisher can distinguish the three main faces on almost any diamond crystal, i. e. the cube plane, dodecahedron plane and octahedron plane, from the way the diamond reacts to the grinding wheel, he can adjust the diamond with some degree of accuracy. It was, however, found in a large number of cases that the planes polished by the diamond polisher according to the external structure of the stone do not coincide with the crystal orientation of the stone as found by X-ray diffraction.

Differences up to ±12 deg. have been observed. Based on these data, the angular adjustment of the dop about the two axes should be within a range of ±15 deg.

Figure 2:
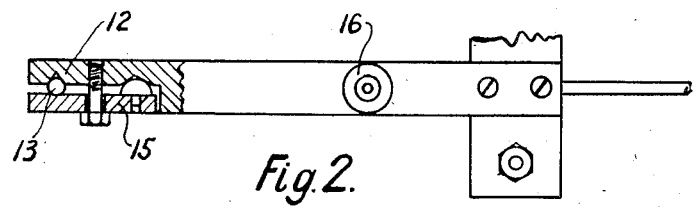
Figure 3:
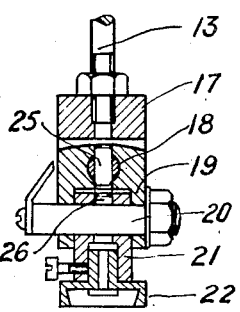
Figure 6:
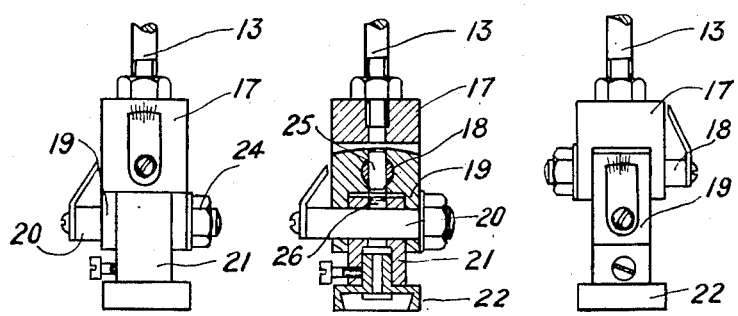
Figure 4:
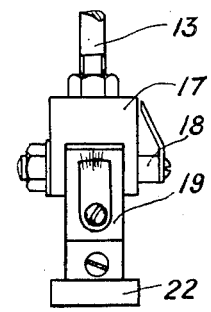
Figure 5:
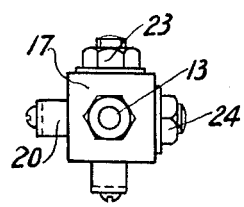
Figure 7:
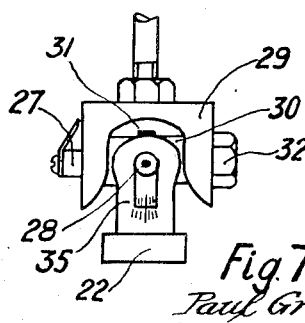

The invention and the method of operation of the device may best be understood by reference to the following description taken in connection with the accompanying drawing showing an embodiment of the new device by way of example. In this drawing:

Fig. 1 is a tang in side elevation;
Fig. 2 is a fractional partial sectional new of the tang;
Fig. 3 is a front elevational view of the dop;
Fig. 4 is a side elevational view of the dop;
Fig. 5 is a plan of a mechanical dop with adjustment in two directions;
Fig. 6 is a cross section through the dop as shown in Figures 3, 4 and 5; and
Fig. 7 is a modification of the dop shown in Figures 3 to 5.

The tang T in Figs. 1 and 2 is adjustable with regard to the approximately horizontal surface of table 1 and the surface of scaife 2 in two directions at right angles to each other. The tang T is placed with its two feet 3 (only one is shown in Fig. 1) with ball ends 4 in slidable shoes 5 engaged by cup-shaped recesses under the feet. The shoes 5 may consist of a "Bakelite" base and a metal support containing the ball 4 held by a split ring, or the balls may be fixed to the feet resting in recessed shoes.

Feet 3 are set with sliding fit in cross-piece 8 of the tang and positioned by nut and lock-nut 9 on upper and lower threaded portion 10 so as to adapt the position of the crosspiece to the unavoidable differences in the surfaces of the worktable and the scaife. Beam 11 fixed to crosspiece 8 is provided with groove 12 to accommodate stem 13 of dop unit D. If tang T is correctly adjusted so that the axis of stem (dop unit D) lies in a vertical plane with regard to the horizontal surface of scaife 2 the correct height adjustment of stem 13 fixed to beam 11, by clamping piece 15, will ensure that the axis of stem 13 (dop unit D) is perpendicular to scaife 2. These adjustments may be checked by a circular spirit level 16 on beam 11. All further angular adjustments are referred to this axis. The dop unit D is then transferred to the X-ray goniometer and the required adjustment of the diamond or any other crystalline substance made with regard to the dop axis, so that on removing the dop and placing it again in the previously adjusted position in the tang, the diamond or other substance will automatically take up the correct position on the scaife.

As it is hardly possible to use the ordinary method of adjusting the inclination of a dop by bending the stem for obtaining accurate results, it is preferable to make use of a mechanical dop as shown in Figs. 3 to 6. Stem 13 is screwed into upper forked member 17 with pin 18 at right angles to the axis of stem 13. Mounted on pin 18 is lower forked member 19 with pin 20 at right angles to pin 18. Mounted on pin 20 is dop carrier 21 in whose centre hole can be inserted, and clamped by a screw, the stub end of a socket 22 for accommodating a solder dop (not shown). Means for location of carrier 21 to prevent its rotation can be provided. Stub end and hole may be polygonal or provided with a key. The use of a solder dop for fixing the diamond has the advantage that the stone on which one correctly orientated plane has to be found, can be of absolutely irregular shape.

The lower forked member 19 and the dop carrier 21 can be clamped in angularly adjusted position by turning nuts 23 and 24 respectively on pins 18 and 20. For controlling the angular adjustment of the parts 19 and 21 an arcuate graduation is engraved on upper forked member 17 and on lower forked member 19 co-operating with vernier tongues screwed to pins 18 and 20. Pins 18 and 20 can turn in the forked members 17 and 19. Pin 18 is rigidly connected to lower forked member 19 by cotter pin 26, so that the angular deviation is indicated by the angle between the centre position of the tongue and the centre line of the forked member 19 or the dop carrier 21 respectively. A maximum angular deviation of ±15 deg. will suffice in most cases.

Fig. 7 shows a modification of the dop unit with the axes of the pivoting members in the same plane at right angles to each other. Pin 27 is set in upper forked member 29 of such a shape that intermediate piece 30 with two lateral opposite stub axles 28 can swing about 15 deg. to both sides. Piece 30 is connected to pin 27 by cotter pin 31 and clamped in similar manner as pin 18 by nut 32. Around the stub axles 28 is pivotable forked dop carrier 35 and clamped in position by a screw (not shown). Socket 22 is set in dop carrier 35 as in dop carrier 21. Instead of providing pivots by cross-wise arranged pins, an adjustable universal ball joint may be used to be locked in the adjusted position so that the axis of the stem (dop) and the axes around which the angular adjustment is carried out intersect in one point.

What we claim as our invention and desire to secure by Letters Patent is:

Method of producing specifically orientated polished faces on diamonds comprising the following steps, namely, (1) clamping the stem of a dop unit with a diamond fixedly mounted therein in a tang over a scaife; (2) adjusting the dop in a polishing position chosen according to practical experience; (3) taking the stem with the thus adjusted dop out of the tang and transferring it into a corresponding holder for the stem in an X-ray goniometer for the control of correct crystal orientation; (4) adjusting the dop with regard to a desired plane as determined by direct observation in the goniometer without altering the position of the stem in the holder; (5) transferring the stem with the X-ray adjusted dop into its previous position in the tang and setting the tang in its previous position with the oriented diamond face on the scaife; and (6) polishing the diamond as set.

PAUL GRODZINSKI.
ARNO LUDWIG KARL PENKUHN.

References Cited in the file of this patent

UNITED STATES PATENTS

| Number | Name | Date |
| --- | --- | --- |
| 740,902 | Oostendorp | Oct. 6, 1903 |
| 1,103,698 | Soetens | July 14, 1914 |
| 1,415,118 | Ries | May 9, 1922 |
| 1,958,021 | Schmidt | May 8, 1934 |
| 2,326,319 | Bailey | Aug. 10, 1943 |
| 2,377,862 | Bond | June 5, 1945 |
| 2,383,131 | Kirsch | Aug. 21, 1945 |
| 2,392,528 | Fankuchen | Jan. 8, 1946 |
| 2,450,984 | Pastore | Oct. 12, 1948 |
| 2,484,574 | Leiman | Oct. 11, 1949 |

FOREIGN PATENTS

| Number | Country | Date |
| --- | --- | --- |
| 558,518 | Great Britain | Dec. 23, 1943 |